US008190754B2

(12) United States Patent  
Strickland (10) Patent No.: US 8,190,754 B2  
(45) Date of Patent: May 29, 2012

(54) PARENTAL CONTROLS IN A MEDIA NETWORK

(75) Inventor: Shawn Strickland, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 403 days.

(21) Appl. No.: 11/610,833

(22) Filed: Dec. 14, 2006

(65) Prior Publication Data

US 2008/0148310 A1 Jun. 19, 2008

(51) Int. Cl.
*G06F 15/16* (2006.01)
*G06F 3/00* (2006.01)
*H04N 7/16* (2006.01)

(52) U.S. Cl. ........ 709/229; 709/206; 709/210; 709/232; 725/25; 725/27; 725/30; 715/741

(58) Field of Classification Search ................... 709/229
See application file for complete search history.

(56) References Cited

U.S. PATENT DOCUMENTS

| | | | |
|---|---|---|---|
| 2003/0005135 A1* | 1/2003 | Inoue et al. | 709/229 |
| 2003/0046100 A1* | 3/2003 | Yamauchi | 705/1 |
| 2004/0015985 A1* | 1/2004 | Kweon | 725/30 |
| 2004/0174905 A1* | 9/2004 | Caspi et al. | 370/486 |
| 2004/0231003 A1* | 11/2004 | Cooper et al. | 725/135 |
| 2005/0097612 A1* | 5/2005 | Pearson et al. | 725/82 |
| 2006/0190402 A1* | 8/2006 | Patron et al. | 705/51 |
| 2007/0005796 A1* | 1/2007 | Reynders | 709/232 |
| 2007/0124785 A1* | 5/2007 | Marsico | 725/105 |
| 2007/0150918 A1* | 6/2007 | Carpenter et al. | 725/25 |
| 2007/0174476 A1* | 7/2007 | McEnroe et al. | 709/231 |

* cited by examiner

*Primary Examiner* — Kenny Lin
*Assistant Examiner* — Jasmine Myers (57) ABSTRACT

Access to media content is restricted. A message may be sent to a remote computer requesting access to the media content, wherein the message is based at least in part on user input. A response to the message may be received from the remote computer. It may be determined whether to provide access to the media content based on the response.

21 Claims, 4 Drawing Sheets

PARENTAL CONTROLS IN A MEDIA NETWORK

BACKGROUND INFORMATION

Persons accessing media programming such as television programming may be required to enter a user identifier or the like before access to programming is granted, e.g., by a content processing device such as a set top box (STB). For example, such a mechanism may be used to provide parental controls of programming accessed by children. A user identifier may be associated with a user profile that specifies particular media channels that the child may access, and/or times when the child may access these media channels. Establishing and modifying a profile that governs a user's access to media channels generally requires direct access to the STB, e.g., where a menu or the like provided by the STB and displayed on a media playback device such as a television enables initialization and/or modification of the profile. However, since parents do not always have direct access to the STB, maintenance of parental controls can be cumbersome and inconvenient.

DETAILED DESCRIPTION OF PREFERRED EMBODIMENTS

Figure 1:
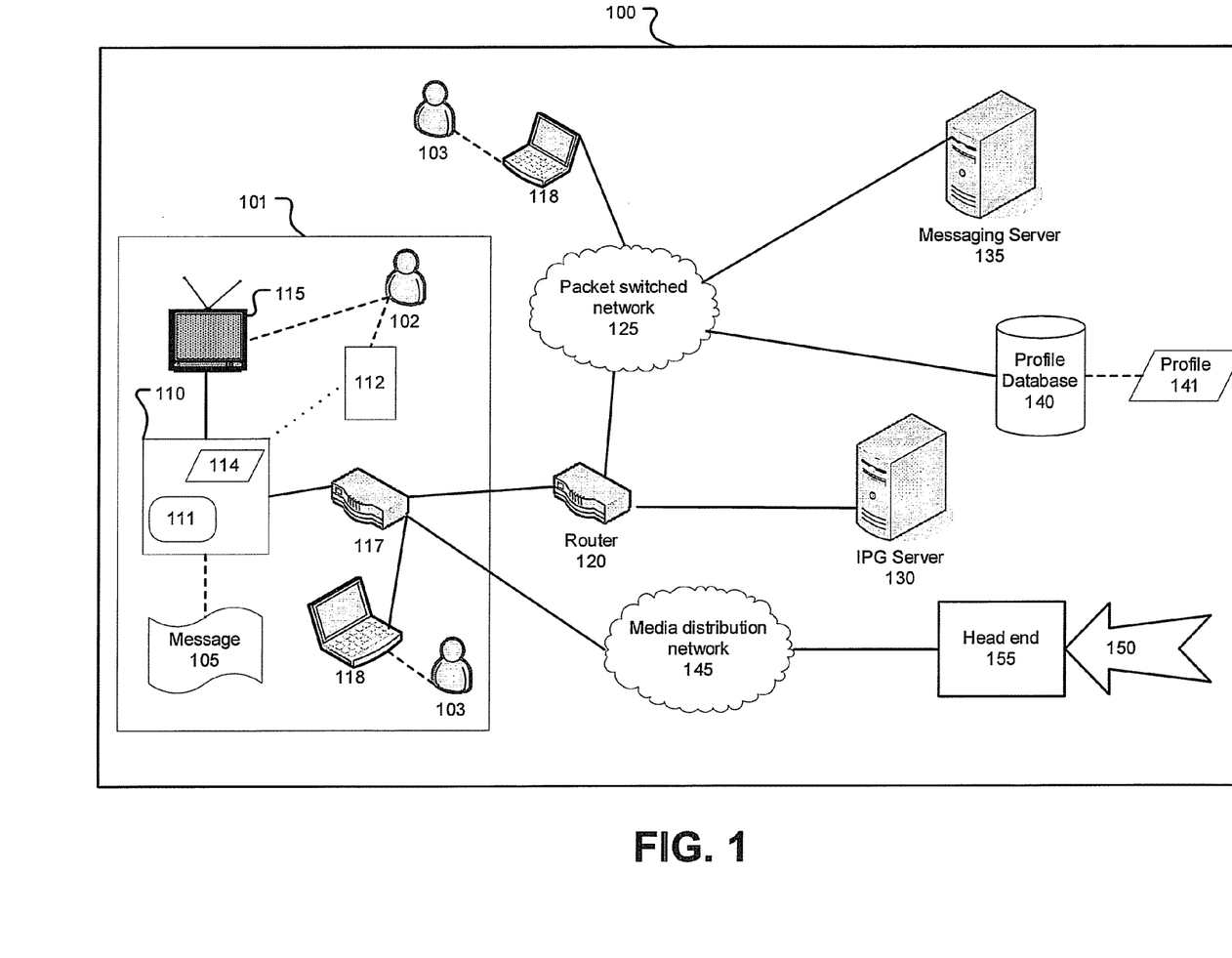
FIG. 1 illustrates an exemplary system for delivering media content and providing messages and instructions.

FIG. 1 illustrates an exemplary system 100 for delivering media content 150 to a customer premise 101, whereby a user 102 may access the content 150 through a media playback device 115. Customer premises 101 may be a home, business, or any other location including a content processing device 110, and may include multiple content processing devices 110, although only one content processing device 110 is shown in FIG. 1.

Content processing device 110 generally is a specialized device, e.g., a set top box (STB) or similar device, for receiving media content 150 from head end 155 via network 145, and for providing media content 150 to media player 115. Media content 150 may be provided as an analog or as a digital signal, e.g., an analog or digital video signal. Content processing device 110 generally includes a processor and a memory, and may be provided with a proprietary or specialized operating system. For example, content processing device 110 may be an STB provided with a real time operating system (RTOS) such as is known. However, it will be understood that content processing device 110 may be a computing device such as one of those enumerated below, so long as the computing device is capable of receiving media content 150 from network 145, and is capable of storing and executing the instructions included in a message 105. Content processing device 110 generally also includes, e.g., stored in a read only memory (ROM), a unique or substantially unique identifier 114 that identifies the content processing device 110.

Media player 115 receives media content 150 from content processing device 110, and plays such media content 150 so that it can be perceived by a user. Media player 115 may be a television receiver, such as is known, including a television or a high definition television (HDTV). Media player 115 may also be used to provide a user interface to certain functions and menus provided by content processing device 110. For example, a television may be used to display a graphical user interface to access various menus within an STB.

A user 102 may utilize a control 112 to operate content processing device 110. Control 112 is generally a remote control that can selectively communicate with content processing device 110 through known wireless communications including infrared (IR) and radio frequency (RF) communications. Control 112 may include numeric keys, arrow buttons, keys for specific functions, etc., and may also include alphanumeric keys. Control 112 may also be a wired or wireless keyboard as is known. A user 102 may utilize control 112 to select media content channels, access various menus and optional settings, make selections and requests, and input data, such as a text message. Control 112 generally facilitates access to various to functions and menus provided by or through content processing device 110, and may also be used to control other devices, including media player 115. For example, control 112 may be used to input and send text messages such as instant messages.

Content processing device 110 selectively communicates with various devices via a broadband home router (BHR) 117, including a client computer 118, which may be accessed by a user 103. BHR 117 may be one or more devices that are generally known for routing network traffic. BHR 117 facilitates data transfer over one or more networks, including a packet switched network 125 and a media distribution network 155.

BHR 117 is known for distributing audio, video, and data to devices within customer premises 101 such as content processing device 110. For example, BHR 117 may be a broadband home router or wireless broadband home router from Actiontec Electronics, Inc. of Sunnyvale, Calif. BHR 117 may also provide a wired or wireless local area network (LAN), thereby providing selective communications between various devices within customer premises 101. For example, client computer 118 may utilize BHR 117 to communicate with content processing device 110. Client computer 118 may be a computer workstation, a desktop, notebook, laptop, handheld computer, a personal digital assistant (PDA), a cellular phone, a smartphone, or some other computing device utilizing hardware and software to communicate with content processing device 110. Client computer 118 is sometimes referred to as a "remote computer" even though it may be included within the same customer premises as content processing device 110.

Content processing device 110 may use BHR 117 to send information to, and receive information from, a packet switched network 125. BHR 117 may access packet switched network 125 through a gateway router 120. An interactive program guide (IPG) server 130 and a messaging server 135 may also selectively communicate with router 120, sometimes via network 125, but may also selectively communicate with BHR 117 via a media distribution network 145. Further, client computer 118 may communicate through packet switched network 125, thereby enabling a user 103 to send and receive messages 105 anywhere that client computer 118 may access the network 125.

Media distribution network 145 is a network for providing media content 150, such as is known. For example, network 145 may include hardware and software for providing a video signal via a coaxial cable and/or a fiber optic cable. As is known, media content 150 is generally provided to a media distribution network 145 from a head end 155.

Packet switched network 125 is generally an internet protocol (IP) network that utilizes known protocols. For example, network 125 uses protocols such as user datagram protocol (UDP), transmission control protocol (TCP), hypertext transfer protocol (HTTP), etc. Further, network 125 may include a variety of networks such as a wide area network (WAN), e.g., the internet, a local area network (LAN), etc. As is known, packet switched network 125 may be used to transport a variety of data, including multimedia data, such as audio and video. Accordingly, it will be understood that embodiments are possible in which networks 125 and 145 are in fact combined into a single network, or in which media distribution network 145 is simply omitted, whereby packet switched network 125 is used to provide media content 150 to content processing device 110.

Gateway router 120 is known for routing data packets in packet switched network 125. Gateway router 120 allows content processing device 110 to access packet switched network 125. By communicating with router 120, content processing device 110 is able to obtain a network address such as an internet protocol (IP) address, thereby enabling content processing device 110 to make requests to, and to receive data from, an IPG server 130 and a messaging server 135.

IPG server 130 generally provides information related to available media content 150, and may also provide an interactive program guide to content processing device 110. Media content information may include dates and times of television programs and movies, descriptions of particular content, channel information, and parental guidelines. Parental guidelines may include information about specific programs, movies, or about entire channels. A user 102 or 103, such as a parent, may learn whether a particular program is appropriate for certain age groups through such parental guideline information. For example, a particular program may be flagged as being inappropriate for children under the age of fourteen. Parental guidelines may also include information relating to specific examples of potentially offensive material including various examples of obscenity, indecency, and profanity. The Federal Communication Commission's (FCC) "TV Parental Guidelines," available from the FCC, e.g., at http://www.fcc.gov/parents/parent_guide.html, are one such example of information that may be provided by IPG server 130 to content processing device 110.

IPG server 130 may also provide an interactive program guide to content processing device 110 for display on media player 115. As is known, an interactive program guide allows users to obtain information and to select media content 150, generally by navigating and making selections using control 112. IPG server 130 generally includes a processor and a memory, as well as a computer readable medium such as a disk for storing data, e.g., interactive program guide data, to be provided to content processing device 110.

A messaging server 135 is also in selective communication with content processing device 110 and media access application 111, generally via network 125. Messaging server 135 is generally configured to facilitate transfers of messages 105 between various computing devices including content processing device 110, client computer 118, and profile database 140. Messaging server 135 may be implemented in software running on IPG server 130, content processing device 110, client computer 118, or any other computing device capable of communicating via network 125. However, messaging server 135 may also be a standalone computing device that includes a processor and a memory, as well as a computer readable medium for storing data. Further, messaging server 135 may include other software, such as web server software as is known for providing web pages and the like.

Messaging server 135 may utilize various hardware and software systems to facilitate transfers of messages 105. Messaging server 135 may utilize message transfer systems and protocols for message 105 including protocols for instant messaging such as Session Initiation Protocol for Instant Messaging and Presence Leveraging Extensions (SIMPLE), Extensible Messaging and Presence Protocol, Short Message Service (SMS), or the like. Accordingly, messaging server 135 generally supports real-time or near real-time messaging. Message 105 may also utilize various encryption technologies including public key infrastructure (PKI), digital signatures, digital certificates, secure shell (SSH), secure sockets layer (SSL), and transport layer security (TLS), to name but a few.

In addition, messaging server 135 may include an instant messaging server such as is known, and media access application 111 may include an instant messaging client such as is known. Exemplary uses of content processing device 110 for instant messaging described in co-pending application, entitled INSTANT MESSAGING WITH A MEDIA DEVICE, filed the same day as the present application, and incorporated herein by reference in its entirety. Other exemplary uses for messaging server 135 are described in co-pending application, entitled MESSAGING WITH INSTRUCTIONS FOR MEDIA PLAYBACK, filed the same day as the present application, and incorporated herein by reference in its entirety.

A profile database 140 stores profiles 141. A profile 141 may be associated with one or more various entities, such as a user 102, a content processing device 110, and/or a customer premise 101. Accordingly, profile 141 generally is associated in database 140 with at least one of a user 102 identifier, an identifier 114 for a content processing device, an identifier for a customer premise 101, etc. Further, profile 141 generally includes information identifying subscribed-for services via network 145, such as subscribed-for channels of media content 150. Profile database 140 is generally in communication with content processing device 110 and messaging server 135 via network 125, but may be included within messaging server 135. In fact, it is common for content processing device 110 to retrieve a profile 141 specifying media content 150, e.g., channels of media content 150, which may be provided via the content processing device 110, before media content 150 may be shown via the content processing device 110.

A profile 141 may also include personalization settings, media access restrictions, records of accessed media content 150, etc. For example, to enforce parental controls, profile 141 may include a list of channels of media content 150 that may be accessed only by users 102 providing a passcode, personal identification number (PIN) or the like. As is known, content processing device 110 may require PINs, passcodes or the like in order to display some or all of the available channels of media content 150 from network 145. Such passcodes may be included in a profile 141. Further, various schemes for restricting media content 150 through content processing device 110, which schemes may be selected or defined by a user 102, may also be enforced by using a profile 141. For example, a media restriction scheme may limit the times during a day when media content 150 will be accessible, channels of media content 150 that are accessible, or both. Content processing device 110 may, to take just one example among many, restrict the accessibility of media content 150 to two hours a day, regardless of what channels of, or when, media content 150 is accessed. Accordingly, profile 141 may be used to impose restrictions, e.g., parental controls, on media content 150 that may be accessed through a content processing device 110.

Profile database 140 may provide information that causes content processing device 110 to modify various settings. For example, profile database 140 may receive updated information concerning channels of media content 150 to be made available, possibly including dates and/or times when such channels are to be made available. Content processing device 110 may then receive an updated profile 141, and in turn, modify access to channels of media content 150. A profile 141, and therefore various changes, may apply to all content processing devices 110 that are associated with customer premises 101, to one particular content processing device 110, to a group of users 102, or to a particular user 102. Profile database 140 may be programmed to provide an updated profile 141 to content processing device 110, although content processing device 110 may query profile database 140 periodically for updates, e.g., every ten minutes. Further, content processing device 110 may be programmed to request an updated profile 141 from profile database 140 according to certain events, e.g., upon receiving a notification that a profile 141 has been updated.

Where media content 150 is to be restricted according to the identity of a user 102, content processing device 110 may require that a user 102 be identified before allowing access to media content 150. Authenticating a user 102 may involve the user entering a user identification string, a username and password combination, a personal identification number (PIN), a password, etc., using control 112, or some other authentication method. Content processing device 110 may then query profile database 140 for information from a user profile 141, using protocols such as HTTP to communicate via network 125. Content processing device 110 may use profile 141 to provide the user 102 with various features and services tailored specifically for that user 102. Content processing device 110 may also monitor, store, and send data relating to the user to profile database 140 via network 125. Such information may include listings of accessed media content, dates and times of access, personalized channel lists, favorite TV programs, and accounting data relating to the amount of time the user spent accessing various media content, and may be used to update or modify profile 141. Profile database 140 may then store such information in a relational format, ensuring that such data is correctly associated with a particular user, group, content processing device 110, or customer premises 101.

As mentioned above, content processing device 110, computer 118, or the like may communicate with profile database 140 to manage various user-specific functions and features, including parental control mechanisms. For example, a parent may specify a personal identification number (PIN) to be entered by a child prior to accessing media content 150. Further, a parent may specify particular media content, e.g., programming, that a child may access after providing a PIN. For example, a parent may specify days and/or times of day during which a child may access media content 150, and/or particular programming channels that a child may access.

Message 105 generally includes a text message from a user 102 to a user 103, or vice versa. Message 105 may also be initiated by content processing device 110 according to input from user 102, as described further below. A response to a message 105 initiated by content processing device 110 may include an instruction for content processing device 110 to perform an action, such as modifying various settings within profile 141, which in turn will result in the modification of various settings in content processing device 110. Accordingly, a parent user 103 of computer 118 may receive a first message 105 from content processing device 110 initiated by input from a child user 102, and may respond with a second message 105 asking the child user 102 to confirm that certain conditions have been met, e.g., "Did you clean your room?" Upon a third, responsive message 105 from the child user 102, the parent user 103 may respond to the first message 105 by granting access to media content 150 through content processing device 110.

Computing devices such as content processing device 110, client computer 118, IPG server 130, messaging server 135, and similar devices may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system. Computing devices may include any one of a number of computing devices that are known, including, without limitation, a computer workstation, a desktop, notebook, laptop, handheld computer, or some other computing device.

Content processing device 110 generally also includes media access application 111. Media access application 111 includes computer-executable instructions and may provide various services such as parental controls, remote communications, instant messaging, data collection, etc. For example, media access application 111 generally includes program instructions for, among other things, receiving messages, e.g., instant messages, via a packet switched network 125 and also usually via a messaging server 135, providing such messages for display on media player 115, accepting input from media player 115 in response to messages, providing instructions to and receiving instructions from a profile database 140, etc. Media access application 111 further generally includes program instructions for determining whether content processing device 110 may provide user 102 with access to requested media content 150, e.g., as described further below with reference to process 200 illustrated in FIG. 2.

Media access application 111 or other software and content processing device 110 may also include instructions for providing a graphical user interface (GUI) to a user 102. The GUI may allow a user 102 to modify various internal settings within content processing device 110, and may provide a mechanism for a user 102 to interact with messaging server 135. A user 102 may access the GUI using control 112 and view the GUI using media player 115. For example, media access application 111 may include an instant messaging application, such as an IM client (or other messaging application, as discussed in the above-referenced co-pending application entitled INSTANT MESSAGING WITH A MEDIA DEVICE), that a user 102 can access using control 112 and view using media player 115. A user 102 may supply input, such as is mentioned above, for message 105 using the GUI and control 112. User 102 input may be a text message, or may be derived from a series of menu selections.

Computing devices, such as content processing device 110, generally include instructions executable by one or more computing devices such as those listed above. Computer-executable instructions may be compiled or interpreted from computer programs created using a variety of programming languages and/or technologies known to those skilled in the art, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
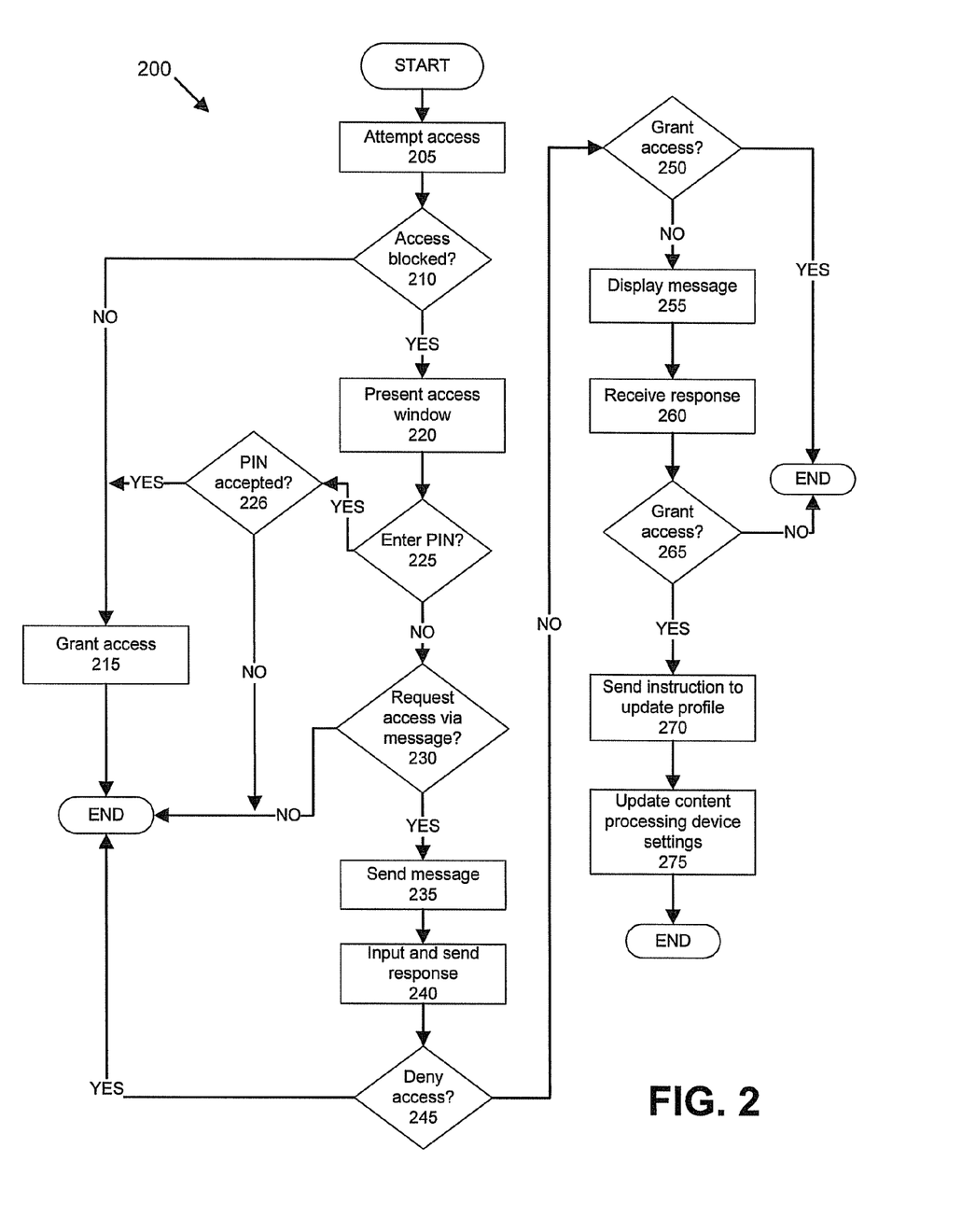
FIG. 2 illustrates an exemplary process for granting permission to access media content.

FIG. 2 illustrates an exemplary process 200 for granting permission to access media content 150. It will be understood that generally user input may be received in various ways by different computing devices. For example, user 103 input may be received by messaging server 135 using a web page or the like the displayed in a browser, such as is known. In addition, client computer 118 may receive user 103 input using special software. User 103 input may also be received by a personal digital assistant (PDA), handheld computer, or the like using special software or a browser. Further, user 102 input may be received by content processing device 110 using media access application 111 and control 112.

In step 205, user 102 attempts to access media content 150, e.g., by selecting a channel of media content 150 through content processing device 110 using control 112.

Next, in step 210, media access application 111 determines whether the user 102 may access the media content 150 requested in step 205. As mentioned above, certain channels of media content 150 may be provided on a restricted basis to users 102. For example, although not illustrated in FIG. 2, users 102 may be required to provide a user identifier or the like prior to accessing any media content 150 through content processing device 110. In such event, profile 141 may provide the content processing device 110 a list of users 102 along with the channels of media content 150 that each user 102 is permitted to access. Alternatively, upon attempting to access media content 150 to which access is restricted, user 102 may be required to enter a PIN or the like prior to access being granted. As mentioned above, such a PIN may be included in profile 141 and provided to content processing device 110. Any event, if access to requested media content 150 by user 102 is not blocked, step 215 is executed next. Otherwise, step 220 is executed next.

In step 215, media access application 111 grants access to requested media content 150, e.g., by providing a channel of media content 150 for display on playback device 115. Following step 215, process 200 ends.

Figure 3:
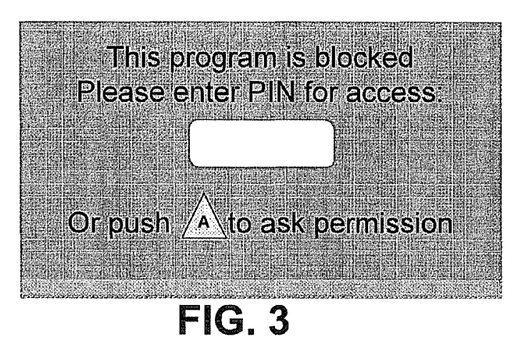
FIG. 3 illustrates an exemplary graphical user interface (GUI) for providing input to obtain access to restricted media content.

In step 220, because access to requested media content 150 is restricted, media access application 111 causes to be presented on playback device 115 a graphical user interface (GUI) whereby a user 102 may provide input to obtain such access. FIG. 3 illustrates an exemplary GUI for providing input to obtain access to restricted media content 150. As seen in the exemplary GUI of FIG. 3, using control 112, user 102 may enter a PIN or the user 102 may press a dedicated button on control 102 to request permission, e.g., from a user 103, for access to the restricted media content 150.

In step 225, media access application 111 determines whether a PIN was entered in step 220. If so, step 226 is executed next. Otherwise, step 230 is executed next.

In step 226, media access application 111 determines whether the PIN entered in step 220 is valid for providing access to requested restricted media content 150 to the requesting user 102. If so, process 200 proceeds to step 215 to provide access to the restricted media content 152 the requesting user 102. Otherwise, process 200 ends.

In step 230, media access application 111 determines whether input has been received from user 102 requesting that a message 105, e.g., to a user 103, be sent to obtain access to requested restricted media content 150.

Next, in step 235, media access application 111 causes a message 105 to be sent, e.g., through messaging server 135, to user 103. The present explanation of process 200 assumes that the identity of the user 103 to whom the message 105 is sent is predetermined, and therefore that in address for the user 103 is also predetermined and selected according to program instructions in media access application 111. For example, the address of the user 103 could be retrieved from profile 141 and stored in memory of content processing device 110. However, it is also possible to provide a user interface to allow user 102 to specify a recipient, e.g., the address of a message recipient. Such an address may be manually entered, selected from an address book, etc., e.g., using control 112.

Figure 4:
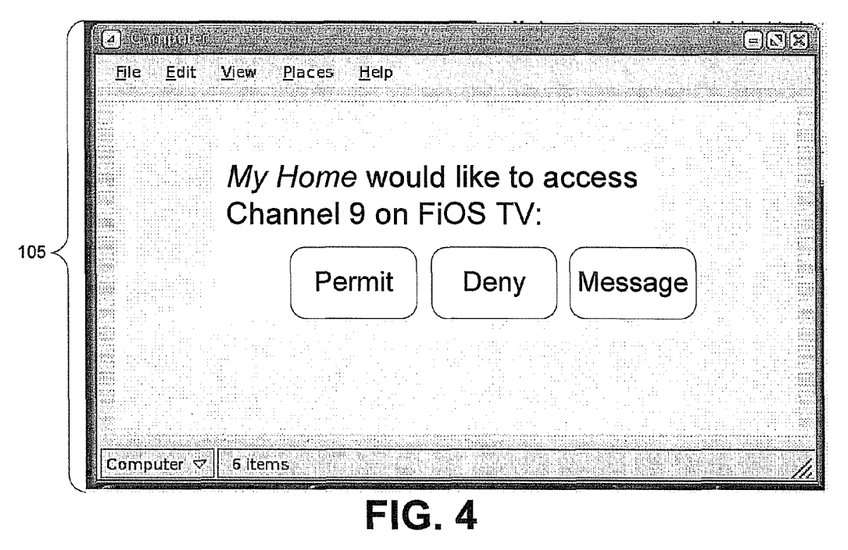
FIG. 4 illustrates an exemplary message from a content processing device to a remote computer.

Next, in step 240, user 103, e.g., in an instant messaging client or the like in computer 118, receives the message 105 sent in step 235, and provides a response, which, after being received as input in computer 118, is sent to content processing device 110. FIG. 4 illustrates an exemplary message 105 provided to a user 103 in step 240. As illustrated in FIG. 4, user 103 may be provided with input buttons or the like as a mechanism for responding to message 105. For example, a user 103 may be provided with buttons to allow the user to either permit the access to media content 150 requested by user 102, deny the requested access, or send a message 105 to the requesting user 102. In the case where user 103 selects to send a message 105 to the requesting user 102, such message 105 is usually input and sent according to normal conventions and protocols for inputting and sending an instant message or the like. As discussed above, a message 105 input in step 240 may be a question for user 102, such as "Have you done your homework?" or "Have you cleaned your room?"

Next, in step 245, media access application 111 determines whether the response sent in step 240 was an indication to deny access to the requested media content 150. If so, process 200 ends. Otherwise, step 250 is executed next.

In step 250, media access application 111 determines whether the response sent in step 240 was an indication to grant access to the requested media content 150. If so, step 270 is executed next. Otherwise, step 255 is executed next.

In step 255, media access application 111 causes the message 105 input in step 240 to be displayed to user 102, e.g., in media player 115.

Next, in step 260, user 102 inputs and sends to user 103 a responsive message 105 to the message 105 sent in step 240. For example, a message 205 sent in step 260 may be something like "Yes, my room is clean."

Figure 5:
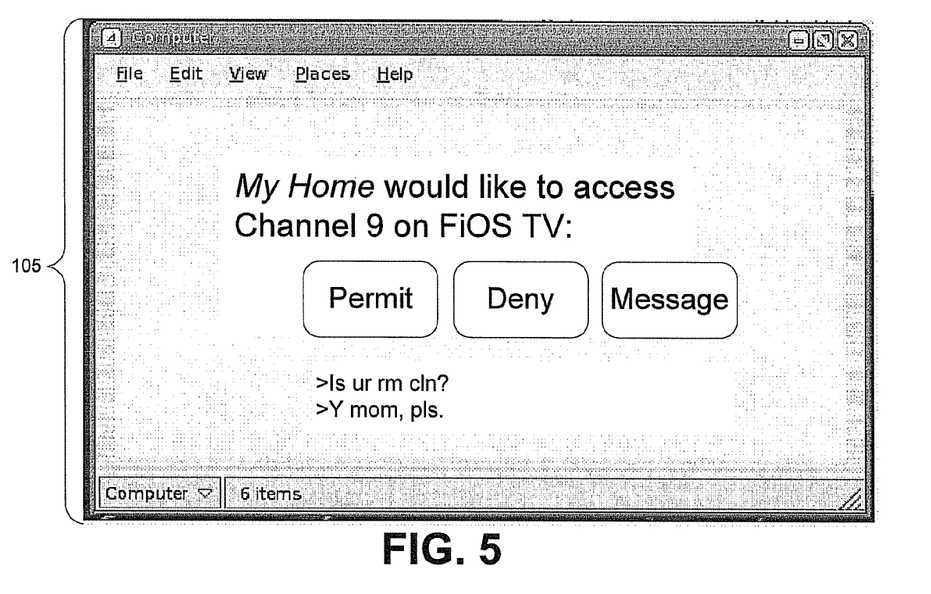
FIG. 5 illustrates an exemplary message that may be displayed on a computer after an exchange of messages between users.

Next, in step 265, it is determined whether user 103 has indicated that access to the requested media content 150 should be granted. It should be understood that steps 255 and 260 may be repeated one or more times before step 265 is reached. FIG. 5 illustrates an exemplary message 105 that may be displayed on computer 118 after an exchange of messages 105 between user 102 and user 103. In the example of FIG. 5, in step 265 it would be determined whether user 103 had selected a "permit" button or the like in step 260. If it is determined that user 103 has not indicated that access to the requested media content 150 should be granted, then process 200 ends following step 265. However, if it is determined that user 103 has indicated that access to the requested media content 150 should be granted, then step 270 is executed next.

In step 270, media access application 111 sends instructions to profile server 142 to update profile 141 to permit content processing device 110 to provide the requested media content 150. For example, media access application 111 may update profile 141 to permit access to particular channel of media content 150, perhaps for a particular period of time.

Next, in step 275, content processing device 110 updates its settings according to updated profile 141. As noted above, content processing device 110 may be programmed to periodically query profile server 144 any updates to profile 141. Alternatively, after requesting an update profile 141 as described above with respect to step 270, media access application 111 may then send a request or trigger to profile server 140 requesting transmission of the updated profile 141, which in turn thereby triggers content processing device 110 to update its settings to permit user 102 to access requested media content 150.

Following step 275, process 200 ends.

CONCLUSION

With regard to the processes, systems, methods, heuristics, etc. described herein, it will be understood that, although the steps of such processes, etc. have been described as occurring according to a certain ordered sequence, such processes could be practiced with the described steps performed in an order other than the order described herein. It will also be understood that certain steps can be performed simultaneously, that other steps can be added, and that certain steps described herein can be omitted. In other words, the descriptions of processes herein are provided for the purpose of illustrating certain embodiments, and should in no way be construed so as to limit the claimed invention.

Accordingly, it will be understood that the above description is intended to be illustrative and not restrictive. Many embodiments and applications other than the examples provided will be apparent to those of ordinary skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it will be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a content processing device; and
a software application included on the content processing device that is configured to:
restrict access to media content that is selectively provided to the content processing device;
send a first message to a remote computer requesting access to the restricted media content, the first message based at least in part on user input provided by a user;
cause the remote computer to display, within an instant messaging client, the first message along with at least one selectable button configured to allow another user to either grant or deny access to the media content by the user;
receive a second message from the remote computer by way of the instant messaging client, the second message input into the instant messaging client by the another user in response to the first message and capable of being read by the user;
send a third message input by the user to the remote computer for display along with the at least one selectable button in the instant messaging client in response to the second message;
determine that the another user has selected a button included in the at least one selectable button displayed in the instant messaging client to either grant or deny the user access to the media content in response to the third message; and
determine whether to provide access to the media content in response to the determination that the another user has selected the button to either grant or deny the user access to the media content.

2. The system of claim 1, wherein the content processing device is a set top box.

3. The system of claim 1, further comprising a messaging server that receives the first message from the content processing device and provides the first message to the remote computer.

4. The system of claim 3, wherein the messaging server and the content processing device are configured to communicate by way of a packet switched network.

5. The system of claim 1, wherein the second message includes an instant message input into the instant messaging client by the another user.

6. The system of claim 1, further comprising a profile database that includes a profile that is used to determine access to the media content.

7. The system of claim 6, wherein the software application is further configured to communicate with the profile database to receive an updated profile based at least in part on the determination that the another user has selected the button to either grant or deny the user access to the media content.

8. The system of claim 6, wherein the software application is further configured to communicate with the profile database to update the profile that is used to determine access to the media content.

9. The system of claim 1, wherein the media content includes a video signal.

10. The system of claim 1, wherein the software application is further configured to provide a graphical user interface configured to allow the user to generate the first and third messages.

11. A method comprising:
   restricting, by a content processing device, access to media content;
   sending, by the content processing device, a first message to a remote computer requesting access to the media content, the first message based at least in part on user input provided by a user;
   causing, by the content processing device, the remote computer to display, within an instant messaging client, the first message along with at least one selectable button configured to allow another user to either grant or deny access to the media content by the user;
   receiving, by the content processing device, a second message from the remote computer by way of the instant messaging client, the second message input into the instant messaging client by the another user in response to the first message and capable of being read by the user;
   sending, by the content processing device, a third message input by the user to the remote computer for display along with the at least one selectable button in response to the receiving of the second message;
   determining, by the content processing device, that the another user has selected a button included in the at least one selectable button displayed in the instant messaging client to grant the user access to the media content in response to the third message; and
   providing, by the content processing device, access to the media content in response to the determining that the another user has selected the button to grant the user access to the media content.

12. The method of claim 11, further comprising communicating with a profile database to receive an updated profile that is used to determine access to the media content.

13. The method of claim 11, further comprising communicating with a profile database to update a profile that is used to determine access to the media content.

14. The method of claim 11, wherein the second message includes a text message input by the another user.

15. The method of claim 11, further comprising:
   sending the first message to the remote computer via a packet switched network; and
   receiving the media content via a media distribution network.

16. The method of claim 15, wherein the packet switched network includes at least one of a local area network and the Internet.

17. The method of claim 11, wherein the media content includes a video signal.

18. The method of claim 11, tangibly embodied as a set of instructions on at least one of a non-volatile computer-readable medium and a volatile computer-readable medium.

19. A system comprising:
   a content processing device configured to restrict access to media content accessible by a user by way of the content processing device; and
   a remote computer selectively and communicatively coupled to the content processing device, the remote computer configured to
      receive a first message from the content processing device requesting access by the user to the restricted media content,
      display, in an instant messaging client, the first message along with at least one selectable button configured to allow another user to either grant or deny access to the media content by the user,
      send a second message to the content processing device by way of the instant messaging client, the second message being input by the another user in response to the first message and capable of being read by the user,
      receive and display in the instant messaging client a third message input by the user and sent from the content processing device in response to the second message, the third message being displayed along with the at least one selectable button,
      detect a selection by the another user of a button included in the at least one selectable button to either grant or deny access to the media content, and
      send a fourth message by way of the instant messaging client to the content processing device in response to the third message and in response to the selection of the button by the another user to either grant or deny access by the user to the media content;
   wherein the content processing device is further configured to determine whether to provide the user with access to the media content based on the fourth message.

20. The system of claim 19, further comprising a messaging server that receives the first message from the content processing device and provides the first message to the remote computer.

21. The system of claim 19, wherein the remote computer is further configured to display the second message along with the at least one selectable button in the instant messaging client.

* * * * *